June 27, 1961  R. BINDER  2,990,041
DEVICE FOR ACCELERATING THE ENGAGEMENT OF CLUTCHES
Filed Oct. 3, 1958  2 Sheets-Sheet 1
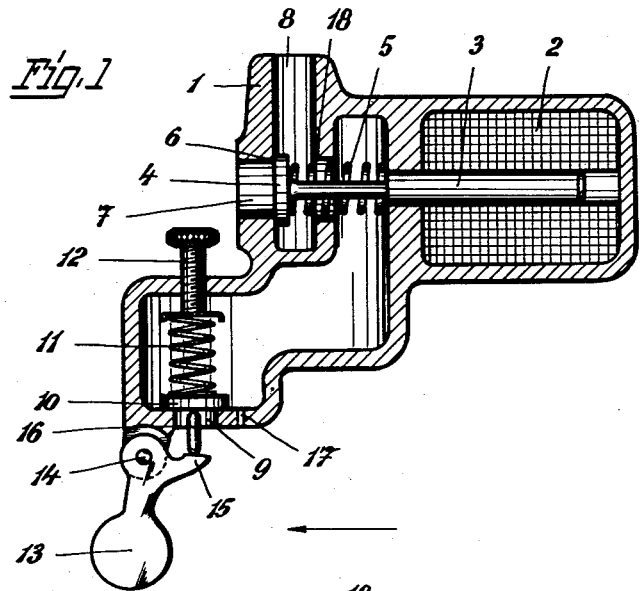
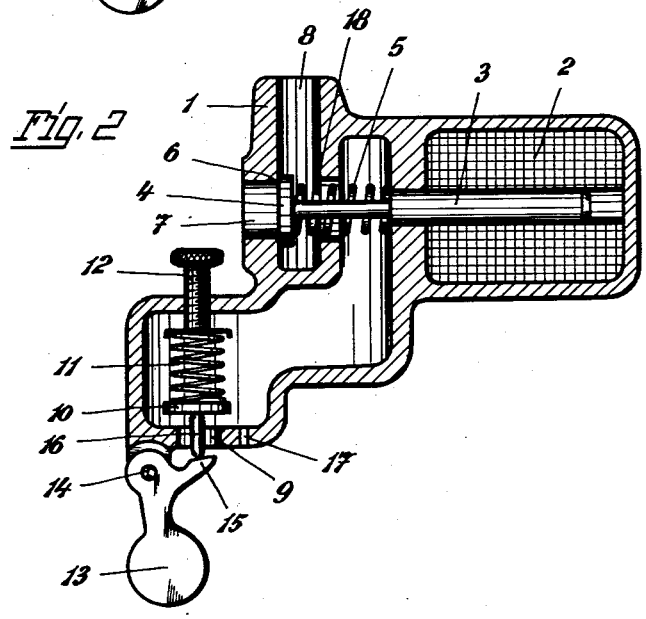
INVENTOR
Richard Binder
BY
ATTORNEYS INVENTOR
Richard Binder
BY Richards Geier
ATTORNEY

United States Patent Office 2,990,041
Patented June 27, 1961

2,990,041
DEVICE FOR ACCELERATING THE ENGAGEMENT OF CLUTCHES
Richard Binder, Schweinfurt (Main), Germany, assignor to Fichtel & Sachs A.G., Schweinfurt (Main), Germany, a corporation of Germany
Filed Oct. 3, 1958, Ser. No. 765,257
Claims priority, application Germany Nov. 9, 1957
2 Claims. (Cl. 192—3.5)

This invention relates to a device for accelerating the engagement of automatic clutches, particularly for motor vehicles, and refers more particularly to a device for improving the control of the engagement operation of automatically actuated clutches for motor vehicles.

The subject matter of the present application is an improvement of the invention described in my co-pending United States patent application, Serial No. 714,659, filed February 18, 1958.

The subject matter of the present invention is particularly applicable to automatic clutches in which the disengagement and the engagement procedures take place during driving for the purpose of switching the drive through air suction, compressed air, or by oil pressure.

Apparatus of this type include control devices which provide a gradual and soft engagement of the clutch after the switching, so long as the driver does not give more gas. In order to prevent the racing of the motor when gas is given immediately after the gear switching, these known devices provide additional control means which provide an acceleration of the engagement operation under these conditions. These control means which accelerate the engagement procedure are partly actuated mechanically in that the control valve for the automatic clutch is coupled with the gas pedal or gas lever, or they are controlled by means of the under-pressure prevailing in the suction pipe of the motor, namely, in that when gas is given suddenly, the rapidly dropping sub-pressure of the motor produces an acceleration of the clutch engagement by means of a diaphragm.

Furthermore, my above-mentioned United States patent application, Serial No. 714,659, describes devices wherein the speed of the clutch engagement after the closing of the switch, is influenced by itself through acceleration and retardation of the speed of the vehicle, namely, either through the use of reaction forces exerted upon any suitable part of the vehicle, such as the driving axle, or by means of a regulating mass which is movable by the retardation and acceleration of the vehicle and thus affects the control means for the clutch engagement.

An object of the present invention is to develop further the inventive features set forth in my above-mentioned patent application, Serial No. 714,659, and to provide a device for accelerating the engagement procedure after gear switching, which is very simple and, therefore, inexpensive in construction and which above all, provides a finely sensitive and continuous acceleration of the engagement procedure.

Other objects of the present invention will become apparent in the course of the following specification:

The objects of the present invention may be realized through the provision of a regulating mass which is influenced by the acceleration of the vehicle and which so affects a control element, for example, a reduction valve of the gear switch, that a gradual and finely sensitive change or acceleration of the clutch engagement takes place.

The invention will appear more clearly from the following detailed description when taken in connection with the accompanying drawings, showing by way of example, preferred embodiments of the inventive idea.

In the drawings:

FIGURE 1 is a diagrammatic sectional view of a control device suitable for operation of the clutch engagement by sub-atmospheric pressure, some parts being shown in side elevation.

FIGURE 2 is similar to FIGURE 1 and shows the device in a different position.

Figure 4:
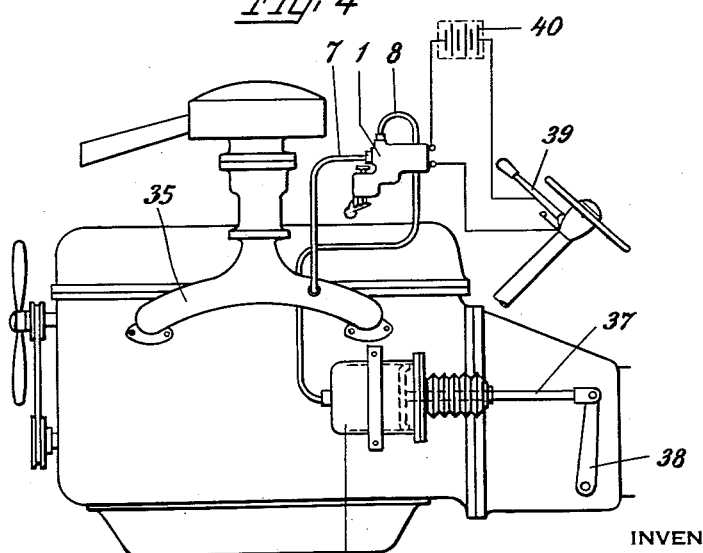
FIGURE 4 is a diagrammatic side elevation showing the connection of the control device of FIGURES 1 and 2 to a motor engine.

The device shown in FIGURES 1 and 2 includes a casing 1 of the control valve for actuating the clutch. An electro-magnet 2 which is located within the casing 1 is energized by electrical current from a battery 40 (FIG. 4) when the current is supplied through the actuation of the gear shifting lever 39. The electro-magnet 2 encloses an armature 3 which is actuated by a rod 4a connected with a valve body or valve disc 4. A coil spring 5 encloses the rod 4a and presses against the valve disc 4 and against the inner wall of the casing 1. Therefore, so long as the magnet 2 is not energized, the spring 5 presses the valve disc 4 against the valve seat 6 which is formed in the casing 1. In this position, the valve disc 4 closes a passage 7 which is connected with the casing 1 and which is also connected with the suction conduit 35 of the motor vehicle. The casing 1 is also connected with a passage 8 which is connected with the servo-motor 36 actuating the clutch engagement operation by means of the rod 37 and the lever 38. Another opening 9 provided in the casing 1, connects the interior of the casing with the atmosphere. This opening 9 is closed by a reduction valve 10 which is pressed against the edges of the opening by a spring 11. The tension of the spring 11 can be varied by an adjusting screw 12.

A regulating mass 13 which has the form of a pendulum, is swingably mounted upon an axle 14 carried by the lower portion of the casing 1. The pendulum 13 has a short lever arm 15 which is in engagement with the reduction valve 10 by means of a pressure element or pin 16. The general arrangement of the device is such that the swinging plane of the pendulum 13 extends in the direction of movement of the motor vehicle, in such manner that when the vehicle is accelerated, the pendulum 13 will swing to the right, looking in the direction of FIGURES 1 and 2. Then the pendulum 13 will be able to exert pressure upon the valve 10 by means of the pin 16 and such pressure can become so great in the case of a maximum acceleration that the pressure of the spring 11 will be overcome and the valve 10 will open.

The operation of the device is as follows:

So long as the magnet 2 is not supplied with electrical energy, namely, so long as the gear shifting lever is not actuated, the valve 4 closes off the suction conduit to the motor and then the servo-motor is connected with the atmosphere through the channel 8 and the reduction valve 10, as well as a small bore opening 17 provided in the casing 1. As soon as the shifting lever is actuated, an electrical contact is closed and the magnet 2 is supplied with electrical energy. Then the armature 3 will be attracted and the valve disc 4 will be pressed upon the valve seat 18 provided within the casing 1, thereby compressing the spring 5. Then the suction conduit 7 will be connected through the conduit 8 with the servo-motor. Consequently, the servo-motor will uncouple the clutch due to the action of the sub-atmospheric pressure of the motor.

When the switching operation is completed and when the gear shifting lever is released, the supply of electrical current to the magnet 2 is interrupted. Then the valve 4 is pressed by the spring 5 against the valve seat 6 in the casing 1 and the connection between the servo-motor and the suction pipe of the motor is interrupted. At the same time, a connection is established between the conduit or passage 8 leading to the servo-motor and the reduction valve 10 and the thin bore hole 17. The reduction valve 10 provides that the sub-atmospheric pressure in the servo-motor is very quickly reduced to an amount which is determined by the tension of the spring 11. The spring 11 is set in such manner that the amount of sub-atmospheric pressure determined by the extent of tension of this spring, provides a partial engagement of the clutch with only a small torque, and thus the clutch begins to engage very softly. So long as the driver does not accelerate the motor, the pendulum 13 will have no effect upon the reduction valve 10, and the remainder of sub-atmospheric pressure still existing in the servo-motor will diminish very slowly through the bore 17, so that the clutch will become completely engaged quite slowly, within a few seconds. In the moment, however, when the driver after the completion of the gear switching gives gas to the motor, the vehicle will be accelerated as soon as the number of revolutions of the motor exceeds the number of revolutions of the drive shaft, namely, with a comparatively small torque transmitted by the clutch in that instant. This acceleration of the motor vehicle will exert a force upon the pendulum or swinging mass 13 in a direction opposite to that in which the vehicle moves, namely, to the right, looking in the direction of FIGURES 1 and 2. The swinging of the pendulum 13 will exert a force through the lever arm 15 and the pressure pin 16 against the reduction valve 10, said force being opposed to that of the spring 11; through this force the closing pressure upon the valve 10 is diminished and thus the sub-atmospheric pressure in the servo-motor will be diminished faster than can be accomplished by the bore hole 17. This drop in the sub-atmospheric pressure will be faster the greater the acceleration of the vehicle and it takes place smoothly and finely and without steps, so that the clutch engagement takes place substantially without jerks and corresponding to the will of the operator.

This type of connection of a swinging mass with a reduction valve is obviously conveniently applicable to automatic clutches as well, wherein the servo-motor is actuated by compressed air or oil pressure. For that purpose it is merely necessary to change the arrangement of the reduction valve or the position of the connecting passages.

Figure 3:
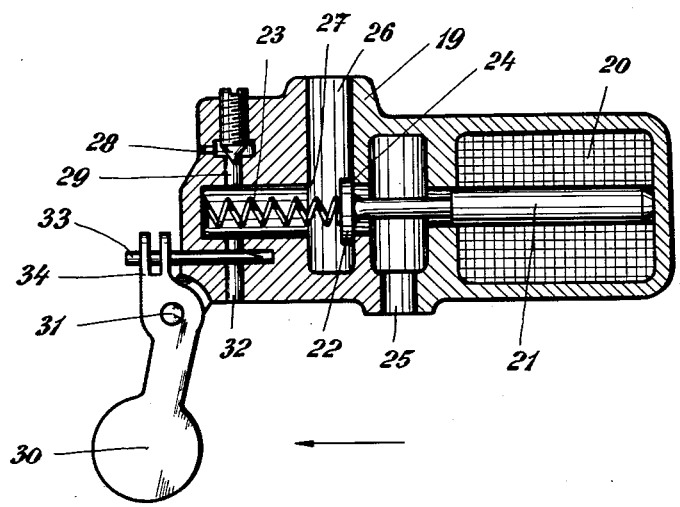
FIGURE 3 is a section through a different embodiment of the inventive idea, some parts being shown in side elevation.

FIGURE 3 illustrates, by way of example, the actuation of a clutch by compressed air or oil under pressure, whereby the regulating mass which is affected by the acceleration of the vehicle, produces a gradual increase in the cross-section of flow of the fluid actuating the clutch. This valve for a clutch actuated by compressed air or oil pressure includes a magnet 20 which encloses an armature 21 connected by a rod 21a with a valve body or disc 22. The casing 19 of the apparatus has a passage 25 for the compressed air and a passage 25 leading to the servo-motor. A spring 23 normally maintains the valve disc 22 in engagement with the valve seat 24, so that the connection between the conduits 25 and 26 is interrupted. As soon as the magnet is energized, the armature 21 will move the valve disc 22 into the conduit 26 and press it against the valve seat 27, thereby compressing the spring 23. Then a connection will be established between the compressed air conduit 25 and the passage 26 leading to the servo-motor.

As soon as the electrical current supplying the control magnet 20 is interrupted, the spring 23 will press the valve disc 22 against the seat 24 into the position illustrated in the drawing, so that compressed air can flow out of the servo-motor only through a narrow opening 29, the size of which can be adjusted by the needle valve 28. Through the use of this needle valve 28, the engagement of the clutch takes place only quite slowly, so that the clutch is softly engaged.

If the speed of the vehicle is accelerated, a pendulum 30 will be actuated which is suspended from the bottom of the casing by a pin 31. The swinging member or pendulum 30 is provided with a short arm 34 which carries a needle 33 of tapering form. The needle 33 is located within an additional passage 32. Thus, a swinging of the pendulum 33 to the right, looking in the direction of FIGURE 3, will withdraw the needle 33 from the passage 32, so that an additional passage will be provided for the outflow of compressed air.

Thus, this device operates in the same manner as the one previously described, namely, so long as the speed of the motor vehicle is not accelerated, the clutch engagement is controlled slowly by the needle valve 28 and will take place with a speed which is determined in advance. In the moment, however, in which the number of revolutions of the motor exceeds the number of revolutions of the driving shaft, an acceleration of the speed of the vehicle takes place, so that the pendulum 30 will swing in the direction opposed to the direction of the movement of the vehicle, namely, to the right, whereby the needle 33 will be then shifted to the left and will gradually free the opening 32, thereby accelerating the clutch engagement.

A particular advantage of this invention consists in that the acceleration of the coupling engagement takes place without steps, that is, quite gradually without any jerks. Furthermore, the described constructions are characterized by their great simplicity. A valve provided with the described pendulum control does not require any further connections, whether they be of a mechanical type such as a gas leverage, or whether they include a hose attached directly to the sub-atmospheric pressure conduit of the motor, or whether they be additional electrical connections at the driving axle of the vehicle, in order to utilize for the control of the clutch operation reaction forces produced by an acceleration of the speed of the vehicle.

It is apparent that the examples shown above have been given by way of illustration and not by way of limitation, and that they are subject to many variations and modifications within the scope of the present invention. All such variations and modifications are to be included within the scope of the present invention.

What is claimed is:

1. In combination with an automatic vehicle clutch and means accelerating the engagement of the clutch when gas is given after gear actuation, a device controlling the engagement of said clutch, said device comprising a casing containing a valve seat and having formed therein a servo-motor-passage communicating with one side of said valve seat and a passage for the actuating fluid communicating with the other side of said valve seat, a gear-shift actuated electro-magnet within said casing, an armature enclosed by said electro-magnet and operated thereby, a valve rod connected with said armature, a valve disc connected with said rod and adapted to engage said valve seat, a spring engaging said valve disc to maintain said valve disc in engagement with said valve seat, thereby interrupting communication between said servo-motor-passage and said actuating-fluid-passage, said valve disc being moved by said rod and said armature out of engagement with said valve seat when said electro-motor is actuated to thereby provide communication between said servo-motor-passage and said actuating-fluid-passage, said casing having a thin bore-hole formed therein and communicating with said servo-motor passage when the switching operation is completed to provide slow reduction of sub-atmospheric pressure in the servo-motor, said casing further having an outlet opening formed therein and communicating with said servo-motor-passage, a reduction valve member for closing said opening, a pivot carried by said casing adjacent said opening, a swinging mass carried by said pivot and adapted to swing by inertia in a direction opposite to that of the movement of the vehicle when the vehicle is accelerated, an arm carried by said mass, and means operatively connecting said arm with said reduction valve member for freeing said opening when the vehicle is accelerated.

2. In combination with an automatic vehicle clutch and means accelerating the engagement of the clutch when gas is given after gear actuation, a device controlling the engagement of said clutch, said device comprising a casing containing a valve seat and having formed therein a servo-motor-passage communicating with one side of said valve seat and a suction conduit communicating with the other side of said valve seat, a gear-shift actuated electro-magnet within said casing, an armature enclosed by said electro-magnet and operated thereby, a valve rod connected with said armature, a valve disc connected with said rod and adapted to engage said valve seat, a spring engaging said valve disc to maintain said valve disc in engagement with said valve seat, thereby interrupting communication between said servo-motor-passage and said suction conduit, said valve disc being moved by said rod and said armature out of engagement with said valve seat when said electro-motor is actuated to thereby provide communication between said servo-motor-passage and said suction conduit, said casing having a thin bore-hole formed therein and communicating with said servo-motor passage when the switching operation is completed to provide slow reduction of sub-atmospheric pressure in the servo-motor, said casing further having an outlet opening formed therein and communicating with said servo-motor-passage, a reduction valve closing said opening, a spring pressing said reduction valve against said opening, an adjusting screw carried by said casing and engaging the last-mentioned spring for varying the tension thereof, a pivot carried by said casing adjacent said opening, a swinging mass carried by said pivot and adapted to swing by inertia in a direction opposite to that of the movement of the vehicle when the vehicle is accelerated, an arm carried by said mass, and a pin carried by said arm and engaging said reduction valve from the side opposite to that engaged by the last-mentioned spring, whereby the swinging of said mass causes said pin to raise said reduction valve.

References Cited in the file of this patent
UNITED STATES PATENTS

| | | |
|---|---|---|
| 2,011,243 | Griswold | Aug. 13, 1935 |
| 2,136,800 | McCollum | Nov. 15, 1938 |
| 2,209,594 | Bragg | July 30, 1940 |
| 2,252,136 | Price | Aug. 12, 1941 |
| 2,255,389 | Lange | Sept. 9, 1941 |
| 2,763,347 | Haubourdin et al. | Sept. 18, 1956 |